US010642045B2

(12) United States Patent
Wall et al.

(10) Patent No.: US 10,642,045 B2
(45) Date of Patent: May 5, 2020

(54) SCANNER-ILLUMINATED LCOS PROJECTOR FOR HEAD MOUNTED DISPLAY

(71) Applicant: Microsoft Technology Licensing, LLC, Redmond, WA (US)

(72) Inventors: Richard Andrew Wall, Kirkland, WA (US); Joshua Owen Miller, Woodinville, WA (US); Tuomas Vallius, Espoo (FI); Andrew Maimone, Duvall, WA (US); Joel Steven Kollin, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 218 days.

(21) Appl. No.: 15/800,993

(22) Filed: Nov. 1, 2017

(65) Prior Publication Data

US 2018/0292654 A1    Oct. 11, 2018

Related U.S. Application Data

(60) Provisional application No. 62/483,250, filed on Apr. 7, 2017.

(51) Int. Cl.
*G02B 27/01* (2006.01)
*G02B 27/42* (2006.01)
(Continued)

(52) U.S. Cl.
CPC ..... *G02B 27/0172* (2013.01); *G02B 26/0833* (2013.01); *G02B 26/10* (2013.01);
(Continued)

(58) Field of Classification Search
CPC ............... G02B 27/0172; G02B 26/10; G02B 27/0081; G02B 26/0833; G02B 27/4205;
(Continued)

(56) References Cited

U.S. PATENT DOCUMENTS 7,252,394 B1   8/2007  Fu
8,837,050 B2   9/2014  Hudman
(Continued)

OTHER PUBLICATIONS

Maeda, et al., "Wearable Scanning Laser Projector (WSLP) for Augmenting Shared Space", In Proceedings of the 14th International Conference on Artificial Reality and Telexistence, Aug. 2004, (6 pages total).

(Continued)

*Primary Examiner* — Kimberly N. Kakalec
(74) *Attorney, Agent, or Firm* — Mark K. Young; Mayer & Williams PC

(57) ABSTRACT

A light engine comprises a liquid crystal on silicon (LCOS) panel that is operated in combination with illumination and imaging optics to project high-resolution virtual images into a waveguide-based exit pupil expander (EPE) that provides an expanded exit pupil in a near-eye display system. In an illustrative example, the illumination optics comprise a laser that produces illumination light that is reflected by a MEMS (micro-electromechanical system) scanner using raster scanning to post-scan optics including a microlens array (MLA) and one or more collimating or magnifying lenses before impinging on the LCOS panel. The LCOS panel operates in reflection in combination with imaging optics, including one or more of beam-steering mirror and beam splitter, to couple virtual image light from the LCOS panel into the EPE.

20 Claims, 17 Drawing Sheets

(51) Int. Cl.
*G02B 26/08* (2006.01)
*H04N 9/31* (2006.01)
*G03B 21/00* (2006.01)
*G02B 27/00* (2006.01)
*G02B 26/10* (2006.01)
*G02F 1/1335* (2006.01)
*G02F 1/1362* (2006.01)
*G02F 1/13357* (2006.01)

(52) U.S. Cl.
CPC ..... *G02B 27/0081* (2013.01); *G02B 27/4205* (2013.01); *G03B 21/006* (2013.01); *H04N 9/3102* (2013.01); *H04N 9/315* (2013.01); *H04N 9/317* (2013.01); *H04N 9/3129* (2013.01); *G02B 2027/0118* (2013.01); *G02B 2027/0123* (2013.01); *G02B 2027/0125* (2013.01); *G02B 2027/0174* (2013.01); *G02B 2027/0178* (2013.01); *G02F 1/136277* (2013.01); *G02F 2001/133616* (2013.01)

(58) Field of Classification Search
CPC .... G02B 2027/0178; G02B 2027/0118; G02B 2027/0125; G02B 2027/0174; G02B 2027/0123; H04N 9/3129; H04N 9/317; H04N 9/3102; H04N 9/315; G03B 21/006; G02F 2001/133616; G02F 1/136277
See application file for complete search history.

(56) References Cited

U.S. PATENT DOCUMENTS

| | | |
|---|---|---|
| 9,300,899 B2 | 3/2016 | Kahle |
| 2004/0239880 A1 | 12/2004 | Kapellner et al. |
| 2006/0018025 A1 | 1/2006 | Sharon et al. |
| 2007/0159673 A1* | 7/2007 | Freeman ............. G02B 5/1814 359/19 |
| 2009/0015929 A1* | 1/2009 | DeJong ............. G02B 27/0081 359/633 |
| 2009/0059336 A1* | 3/2009 | Dunphy ............. G02B 26/008 353/33 |
| 2010/0039796 A1* | 2/2010 | Mukawa ............. G02B 5/18 362/97.1 |
| 2010/0302464 A1 | 12/2010 | Raring et al. |
| 2010/0321781 A1* | 12/2010 | Levola ............. G02B 27/0081 359/569 |
| 2011/0037953 A1 | 2/2011 | Nizani et al. |
| 2011/0213664 A1 | 9/2011 | Osterhout et al. |
| 2012/0057174 A1 | 3/2012 | Briggs |
| 2012/0249416 A1 | 10/2012 | Maciocci et al. |
| 2012/0281721 A1* | 11/2012 | DeJong ............. G02B 26/127 372/9 |
| 2013/0208362 A1 | 8/2013 | Bohn et al. |
| 2013/0301097 A1* | 11/2013 | Hudman ............. H04N 9/3129 359/212.1 |
| 2014/0063473 A1 | 3/2014 | Pasolini |
| 2014/0211322 A1* | 7/2014 | Bohn ............. G02B 27/0081 359/633 |
| 2015/0235629 A1 | 8/2015 | Large et al. |
| 2016/0231567 A1 | 8/2016 | Saarikko et al. |

OTHER PUBLICATIONS

Freeman, et al., "Scanned Laser Pico-Projectors : Seeing the Big Picture (with a Small Device)", In Journal of Optics and Photonics News, vol. 20, Issue 5, May 2009, pp. 28-34. (7 pages total).
Tsai, Chen Jung., "Pico-Projector: 3D & Mobile Interactive Projection", Published on: Mar. 27, 2014 Available at: http://www.fpdchina.org/downloadFile/1304661991000.pdf (30 pages total).
"International Search Report and Written Opinion Issued in PCT Patent Application No. PCT/US18/024982", dated Jun. 22, 2018, 12 Pages.

\* cited by examiner

SCANNER-ILLUMINATED LCOS PROJECTOR FOR HEAD MOUNTED DISPLAY

STATEMENT OF RELATED APPLICATIONS

This application claims benefit and priority to U.S. Provisional Application Ser. No. 62/483,250 filed Apr. 7, 2017, entitled "Scanner-Illuminated LCOS Projector for Head Mounted Display" which is incorporated herein by reference in its entirety.

BACKGROUND

Mixed-reality computing devices, such as head mounted display (HMD) systems and handheld mobile devices (e.g. smart phones, tablet computers, etc.), may be configured to display information to a user about virtual and/or real objects in a field of view of the user and/or a field of view of a camera of the device. For example, an HMD device may be configured to display, using a see-through display system, virtual environments with real-world objects mixed in, or real-world environments with virtual objects mixed in. Similarly, a mobile device may display such information using a camera viewfinder window.

SUMMARY

A small form factor light engine comprises a liquid crystal on silicon (LCOS) panel that is operated as a pico projector in combination with illumination and imaging optics to couple high-resolution virtual images into a waveguide-based exit pupil expander (EPE) that provides an expanded exit pupil in a near-eye display system. In an illustrative example, the illumination optics comprise a laser that produces illumination light that is reflected by a MEMS (microelectromechanical system) scanner, using raster scanning, to post-scan optics including a microlens array (MLA) and one or more collimating or magnifying lenses before impinging on the LCOS panel. The LCOS panel operates in reflection in combination with imaging optics, including one or more of beam-steering mirror and beam splitter, to couple virtual image light from the LCOS panel into the EPE.

Using the LCOS panel as the virtual image source enables projection of high resolution virtual images with a large field of view (FOV) (e.g., greater than 60 degrees) into the EPE. The combination of the MEMS scanner and laser efficiently provides illumination to the LCOS panel while consuming less power than conventional illumination systems such flood illumination. The post-scan optics enable an increase in exit pupil size (e.g., greater than 2 mm) which can broaden the light cone incident on a given pixel in the LCOS panel. The exit pupil of the projector is coupled into the EPE, which may replicate or further expand the pupil in either one or two directions of the FOV. The increased size of the projector pupil can facilitate reduction in artifacts from pupil replication.

By decoupling the imaging and illuminations functions, the MEMS scanner design can be optimized for illumination since it does not need to handle light from the image source. Therefore, scanner resolution and FOV are not design drivers. In addition, the MEMS scanner may be configured to modulate per-color intensity in implementations, for example, in which an RGB (red, green, blue) color model is utilized. Such modulation may be advantageously employed to improve the low-frequency non-uniformity that can arise in waveguide-based displays and be manifested as dark areas within one or more of the color channels. The MEMS scanner modulation reduces local non-uniformities in the display while preserving the bit-depth of the LCOS panel. As a result, contrast ratio and overall brightness of the display typically are increased.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1:
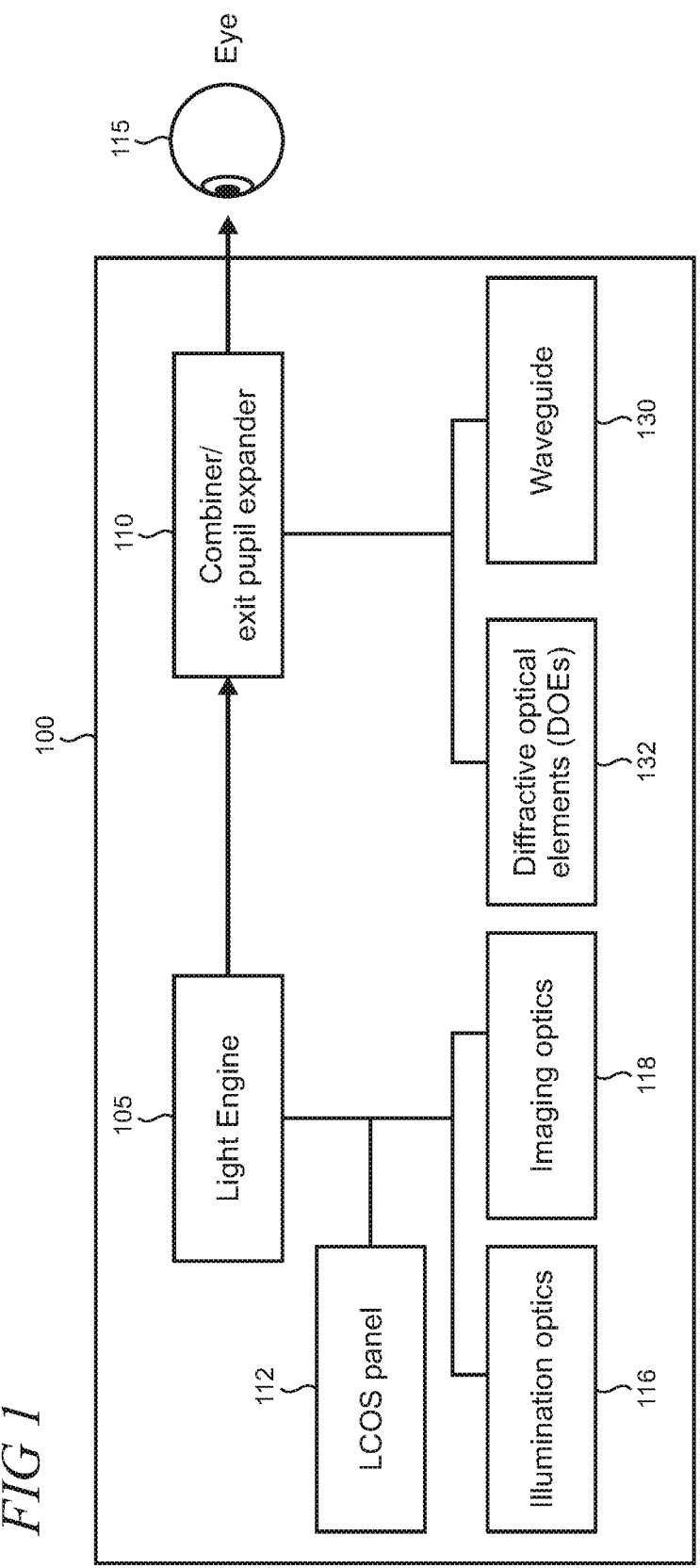
FIG. 1 shows a block diagram of an illustrative near-eye display system.

FIG. 1 shows a block diagram of an illustrative near-eye display system 100 which may incorporate a light engine 105 and a combiner 110 such as an exit pupil expander (EPE), NA (numerical aperture) converter, or other suitable system. The EPE in this illustrative example comprises a waveguide 130 on which multiple diffractive optical elements (DOEs) 132 are disposed and configured to provide in-coupling of incident light into the waveguide, exit pupil expansion in two directions, and out-coupling of light out of the waveguide to an eye 115 of a system user. Near-eye display systems are often used, for example, in head mounted display (HMD) devices in industrial, commercial, and consumer applications. Other devices and systems may also use near-eye display systems, as described below. The near-eye display system 100 is an example that is used to provide context and illustrate various features and aspects of the present scanner-illuminated LCOS (liquid crystal on silicon) projector.

The light engine 105 in system 100 may include one or more virtual image sources, such as a LCOS panel 112, that work with the combiner 110 to deliver images as a virtual display to a user's eye 115. The LCOS panel may comprise a micro-display that provides an array of pixels (picture elements). Other image sources may include RGB (red, green, blue) displays, light emitting diodes (LEDs), OLED (organic light emitting diode) devices, liquid crystal (LC) displays, digital light processing (DLP) displays, or combinations thereof. In this illustrative example, the LCOS panel operates in reflection, but transmissive or emissive display arrangements may be used in alternative embodiments. The light engine 105 may further comprise illumination optics 116 and imaging optics 118 that may be configured to provide illumination in a range of wavelengths and intensities as needed to suit a given implementation.

The LCOS panel 112 can alternatively utilize two types of light modulation including amplitude modulation and phase modulation. In the former case, the amplitude of the light signal is modulated by varying the linear polarization direction of the incident light passing through a linear polarizer, the same principle used in a standard LC displays. In the latter case, the phase delay is accomplished by electrically adjusting the optical refractive index along the light path (which is possible because the LC materials utilized in the display can have non-zero birefringence).

In a near-eye display system the imager does not actually shine the images on a surface such as a glass lens to create the visual display for the user. This is not feasible because the human eye cannot focus on something that is that close. Rather than create a visible image on a surface, the near-eye display system 100 uses combiner 110, such as an exit pupil expander, to form a pupil and the eye 115 acts as the last element in the optical chain and converts the light from the pupil into an image on the eye's retina as a virtual display.

Figure 2:
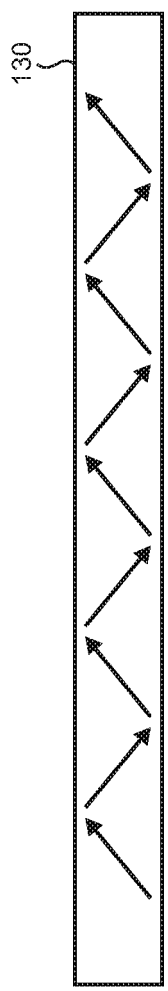
FIG. 2 shows propagation of light in a waveguide by total internal reflection (TIR)

The waveguide 130 facilitates light transmission between the imager and the eye. One or more waveguides can be utilized in the near-eye display system because they are transparent and because they are generally small and light-weight (which is desirable in applications such as HMD devices where size and weight is generally sought to be minimized for reasons of performance and user comfort). For example, the waveguide 130 can enable the imager 112 to be located out of the way, for example, on the side of the user's head or near the forehead, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

Figure 3:
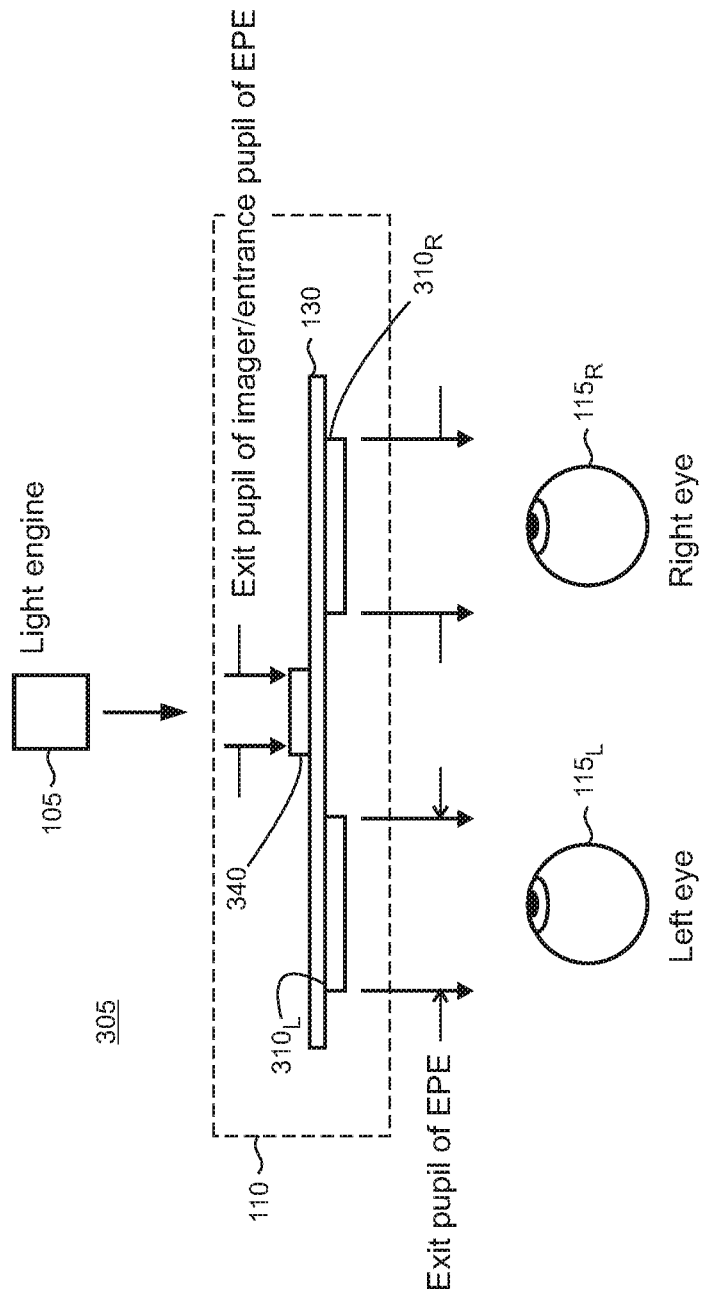
FIG. 3 shows a view of an illustrative exit pupil expander.

FIG. 3 shows a view of an illustrative exit pupil expander (EPE) 305. EPE 305 receives one or more input optical beams from the light engine 105 as an entrance pupil for virtual image light to produce one or more output optical beams with expanded exit pupil in one or two directions relative to the input. The expanded exit pupil typically facilitates a virtual display to be sufficiently sized to meet the various design requirements, such as image resolution, field of view, and the like, of a given optical system while enabling the light engine and associated components to be relatively light and compact.

The EPE 305 is configured, in this illustrative example, to provide binocular operation for both the left and right eyes which may support stereoscopic viewing. Components that may be utilized for stereoscopic operation such as scanning mirrors, lenses, filters, beam splitters, MEMS (micro-electromechanical system) devices, or the like are not shown in FIG. 3 for sake of clarity in exposition. The EPE 305 utilizes two out-coupling gratings, $310_L$ and $310_R$ that are supported on a waveguide 130 and a central in-coupling grating 340. The in-coupling and out-coupling gratings may be configured using multiple DOEs, and may further include one or more intermediate DOEs as described below. While the EPE 305 is depicted as having a planar configuration, other shapes may also be utilized including, for example, curved or partially spherical shapes, in which case the gratings disposed thereon are non-co-planar.

Figure 4:
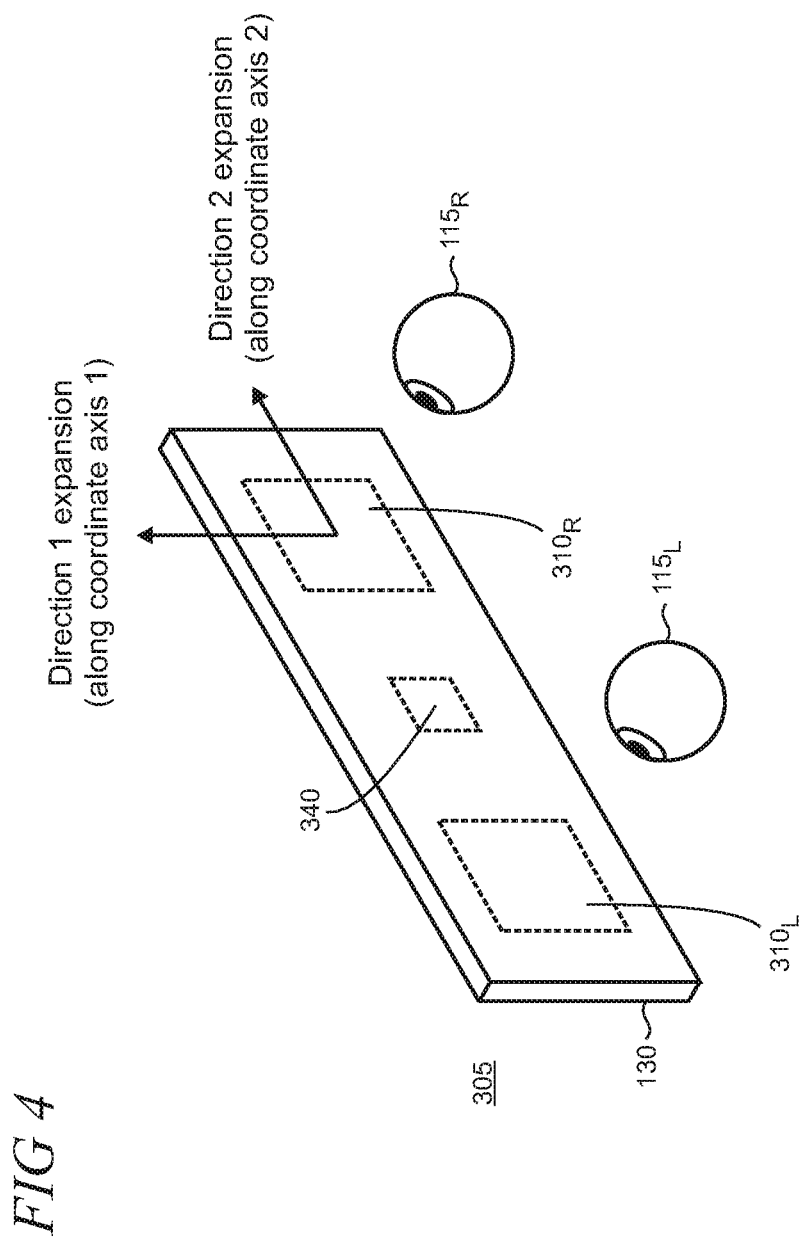
FIG. 4 shows a view of an illustrative exit pupil expander in which the exit pupil is expanded along two directions of the field of view (FOV)
Figure 5:
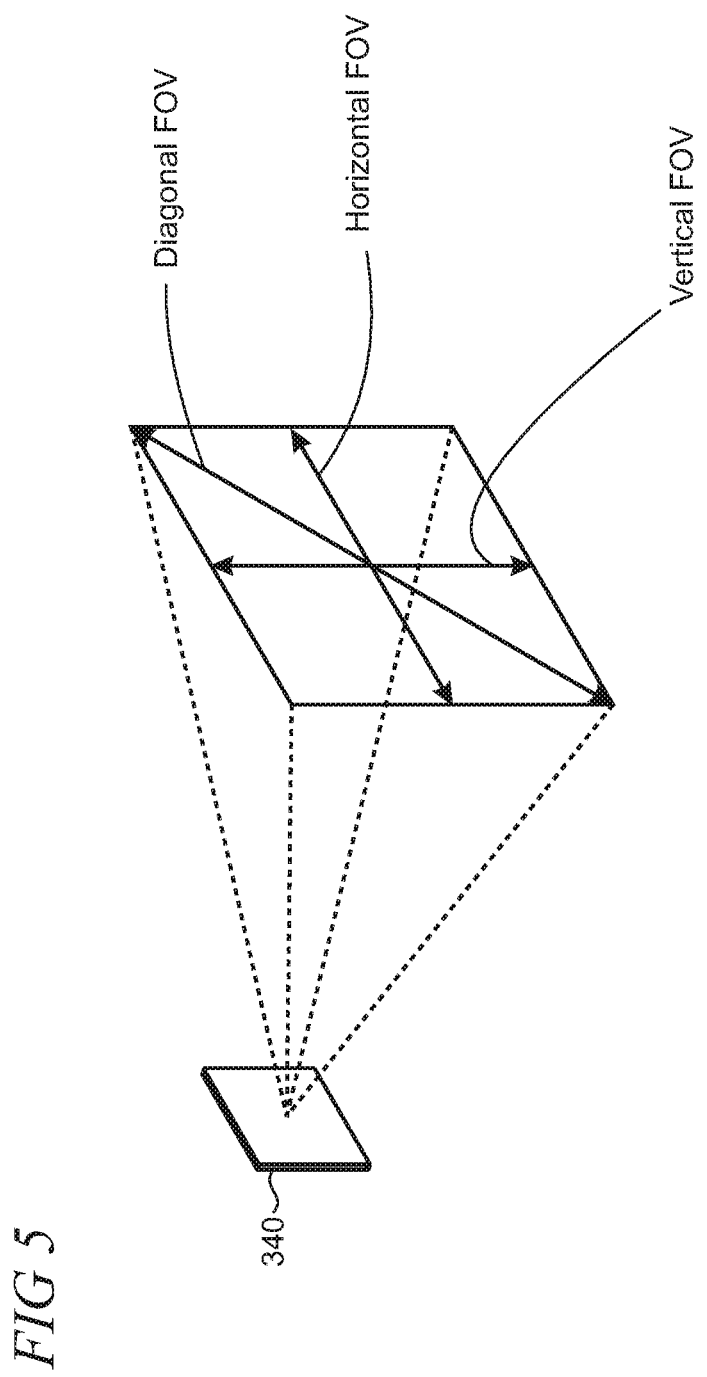
FIG. 5 shows an illustrative input to an exit pupil expander in which the FOV is described by angles in horizontal, vertical, or diagonal orientations.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye display device is upright and forward facing, but less intuitive for other usage scenarios. The listed terms are not to be construed to limit the scope of the configurations (and usage scenarios therein) of near-eye display features utilized in the present arrangement. The entrance pupil to the EPE 305 at the in-coupling grating 340 is generally described in terms of field of view (FOV), for example, using horizontal FOV, vertical FOV, or diagonal FOV as shown in FIG. 5.

Figure 6:
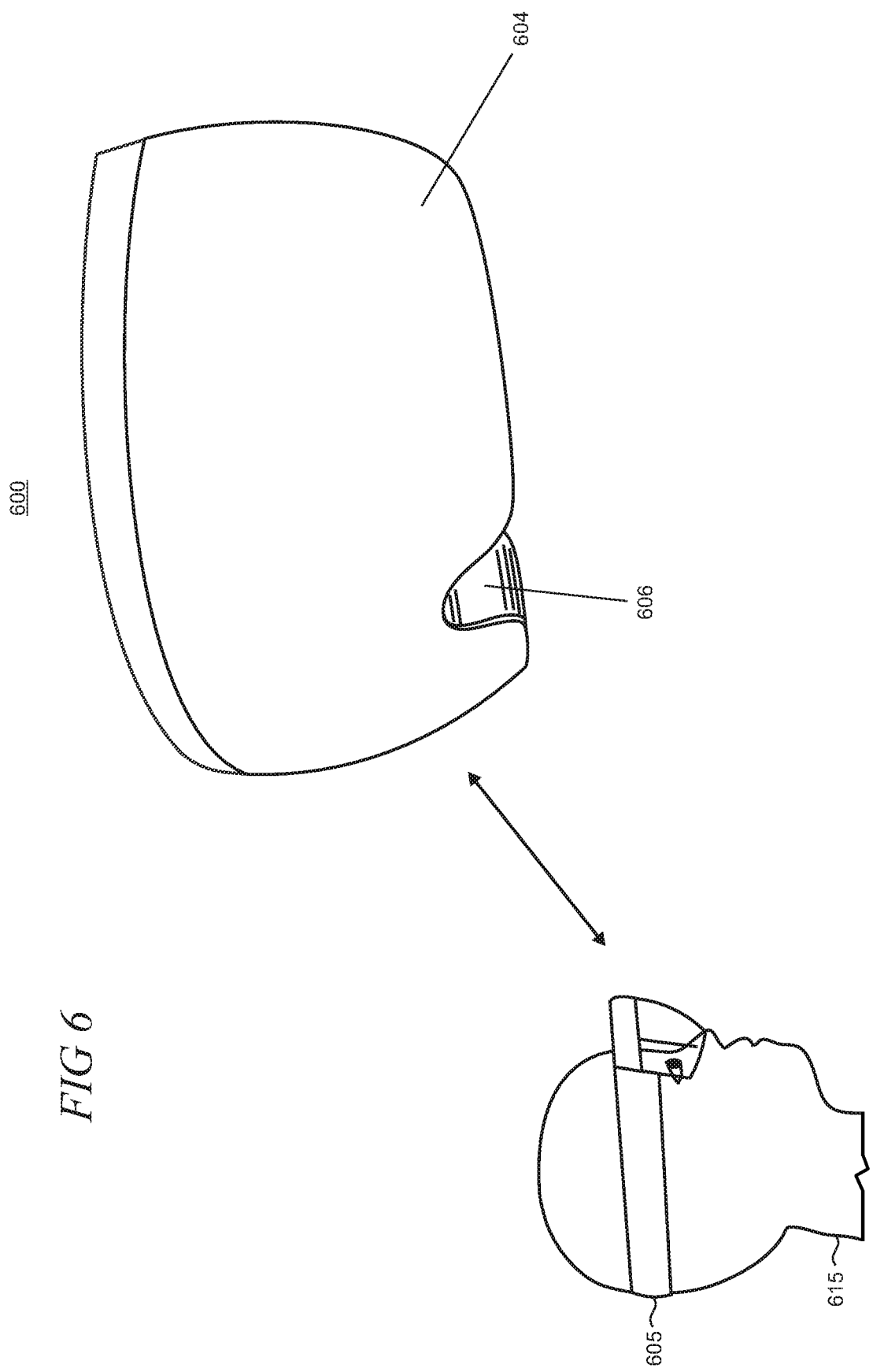
FIG. 6 shows a pictorial front view of a sealed visor that may be used as a component of a head mounted display (HMD) device.

FIG. 6 shows an illustrative example of a visor 600 that incorporates an internal near-eye display system that is used in a head mounted display (HMD) device 605 application worn by a user 615. The visor 600, in this example, is sealed to protect the internal near-eye display system. The visor 600 typically interfaces with other components of the HMD device 605 such as head mounting/retention systems and other subsystems including sensors, power management, controllers, etc., as illustratively described in conjunction with FIGS. 20 and 21. Suitable interface elements (not shown) including snaps, bosses, screws and other fasteners, etc. may also be incorporated into the visor 600.

The visor 600 includes see-through front and rear shields, 604 and 606 respectively, that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 705 shown in the disassembled view in FIG. 7.

The sealed visor 600 can physically protect sensitive internal components, including a near-eye display system 702 (shown in FIG. 7), when the HMD device is used in operation and during normal handling for cleaning and the like. The near-eye display system 702 includes left and right waveguide displays 710 and 715 that respectively provide virtual world images to the user's left and right eyes for mixed- and/or virtual-reality applications. The visor 600 can also protect the near-eye display system 702 from environmental elements and damage should the HMD device be dropped or bumped, impacted, etc.

Figure 7:
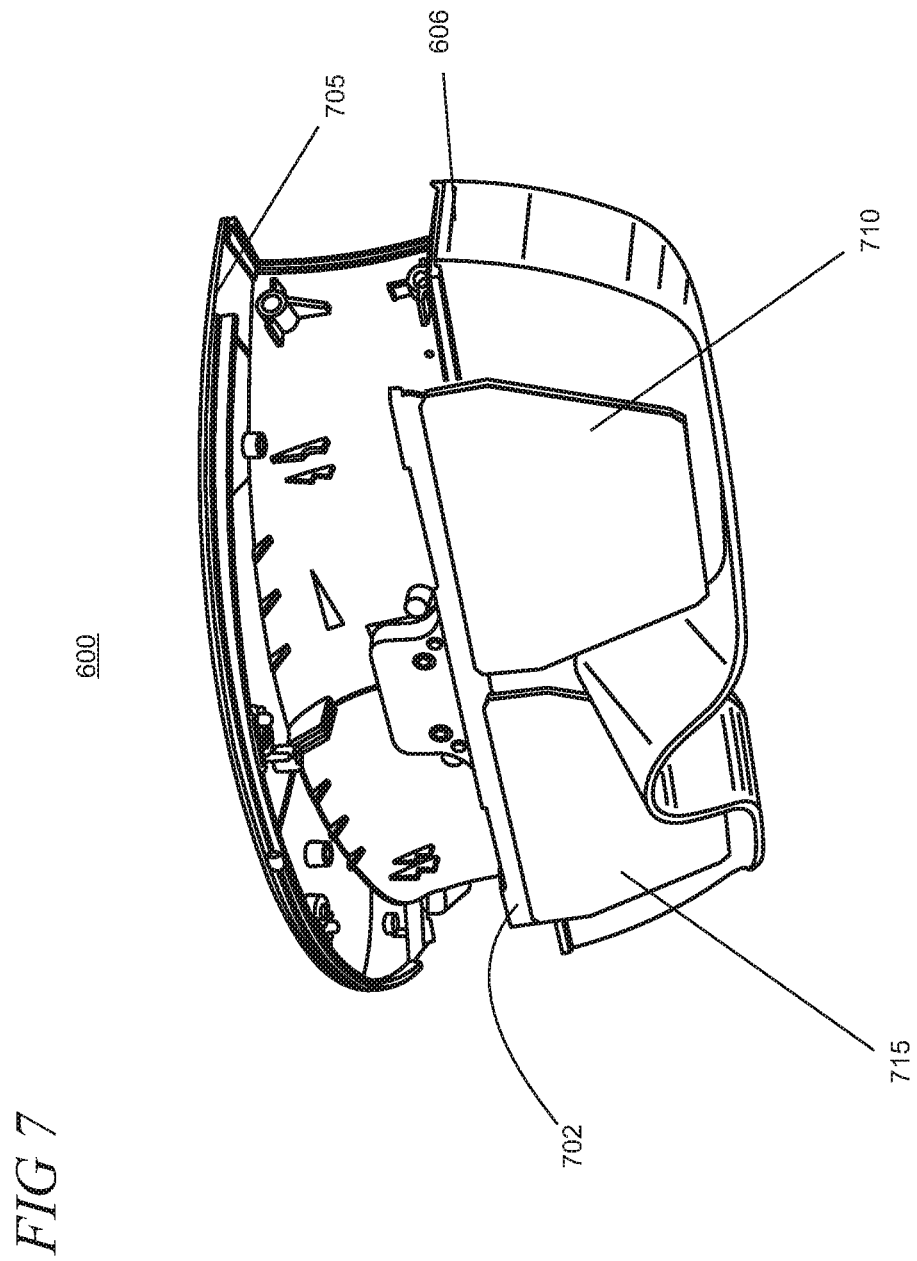
FIG. 7 shows a partially disassembled view of the sealed visor.

As shown in FIG. 7, the rear shield 606 is configured in an ergonomically suitable form to interface with the user's nose, and nose pads and/or other comfort features can be included (e.g., molded-in and/or added-on as discrete components). The sealed visor 600 can also incorporate some level of optical diopter curvature (i.e., eye prescription) within the molded shields in some cases.

Figure 8:
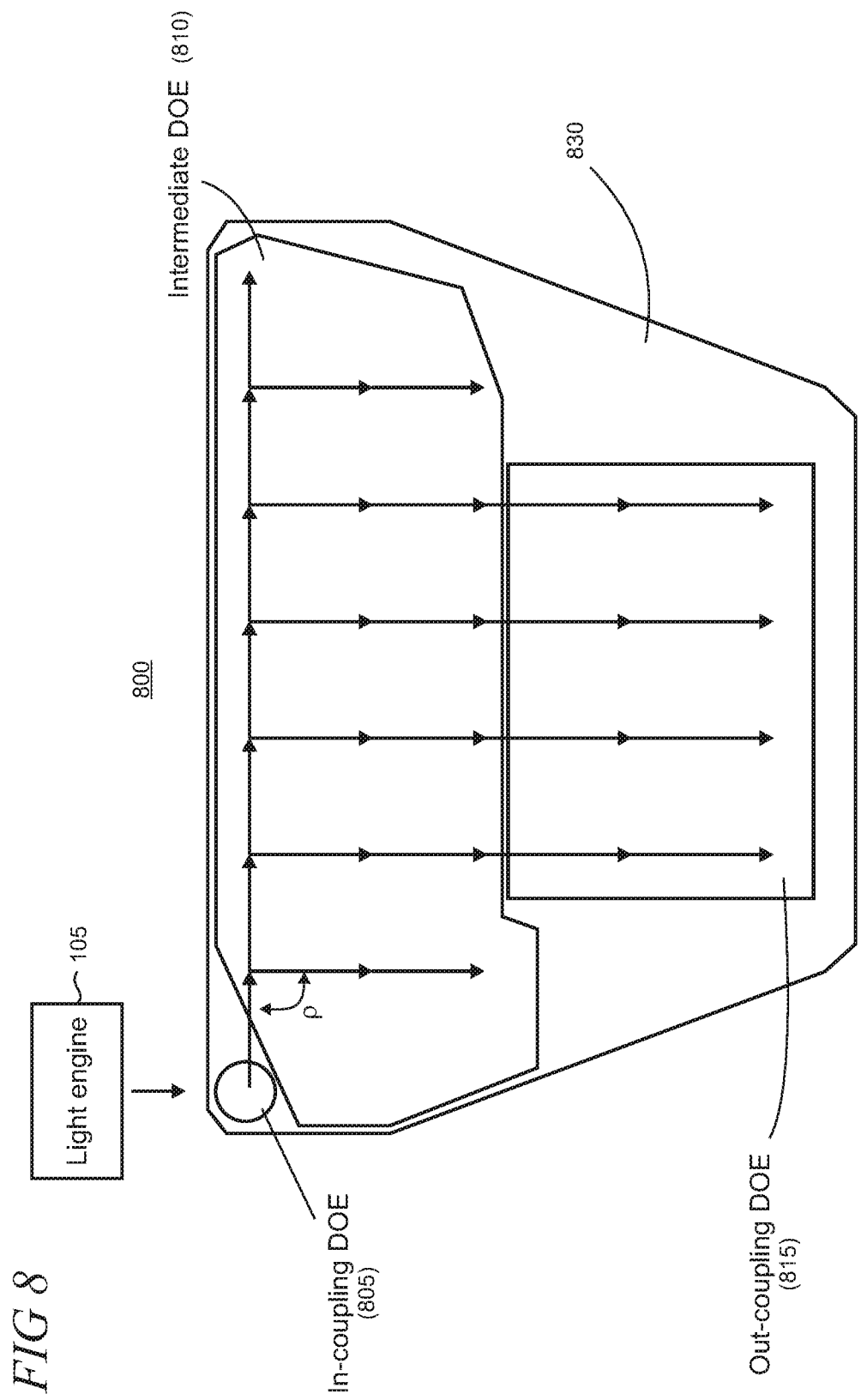
FIG. 8 shows an illustrative arrangement of diffractive optical elements (DOEs) configured for in-coupling, exit pupil expansion in two directions, and out-coupling.

FIG. 8 shows an illustrative waveguide display 800 having multiple DOEs that may be used with, or incorporated as a part of, a see-through waveguide 830 to provide in-coupling, expansion of the exit pupil in two directions, and out-coupling. The waveguide display 800 may be utilized in an exit pupil expander that is included in the near-eye display system 702 (FIG. 7) to provide virtual world images to one of the user's eyes. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating, as described in more detail below in the text accompanying FIGS. 16-19.

The waveguide display 800 includes an in-coupling DOE 805, an out-coupling DOE 815, and an intermediate DOE 810 that couples light between the in-coupling and out-coupling DOEs. The in-coupling DOE 805 is configured to couple image light comprising one or more imaging beams from an imager 105 (FIG. 1) into the waveguide. The intermediate DOE 810 expands the exit pupil in a first direction along a first coordinate axis, and the out-coupling DOE 815 expands the exit pupil in a second direction along a second coordinate axis and couples light out of the waveguide to the user's eye. The angle ρ is a rotation angle between the periodic lines of the in-coupling DOE 805 and the intermediate DOE 810 as shown. As the light propagates in the intermediate DOE 810 (horizontally from left to right in the drawing), it is also diffracted (in the downward direction) to the out-coupling DOE 815.

While DOEs are shown in this illustrative example using a single in-coupling DOE disposed to the left of the intermediate DOE 810, which is located above the out-coupling DOE, in some implementations the in-coupling DOE may be centrally positioned within the waveguide and one or more intermediate DOEs can be disposed laterally from the in-coupling to enable light to propagate to the left and right while providing for exit pupil expansion along the first direction. It may be appreciated that other numbers and arrangements of DOEs may be utilized to meet the needs of a particular implementation.

Figure 9:
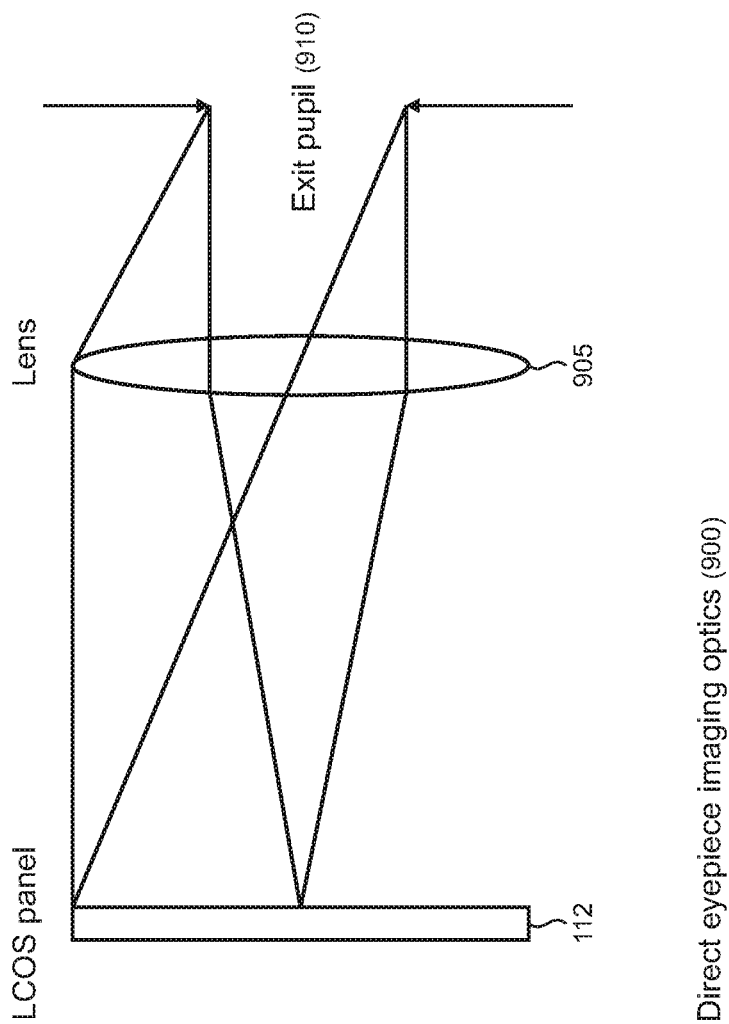
FIG. 9 shows an illustrative projector arrangement used for imaging optics in a light engine employing a direct eyepiece.

The imaging optics 118 (FIG. 1) in the light engine 105 may comprise a simple direct eyepiece 900 in some implementation, as illustratively shown in FIG. 9. Here, the LCOS panel 112 operates in conjunction with a lens 905 to form an exit pupil 910. The lens 905 may provide collimating or magnifying functions, or both.

Figure 10:
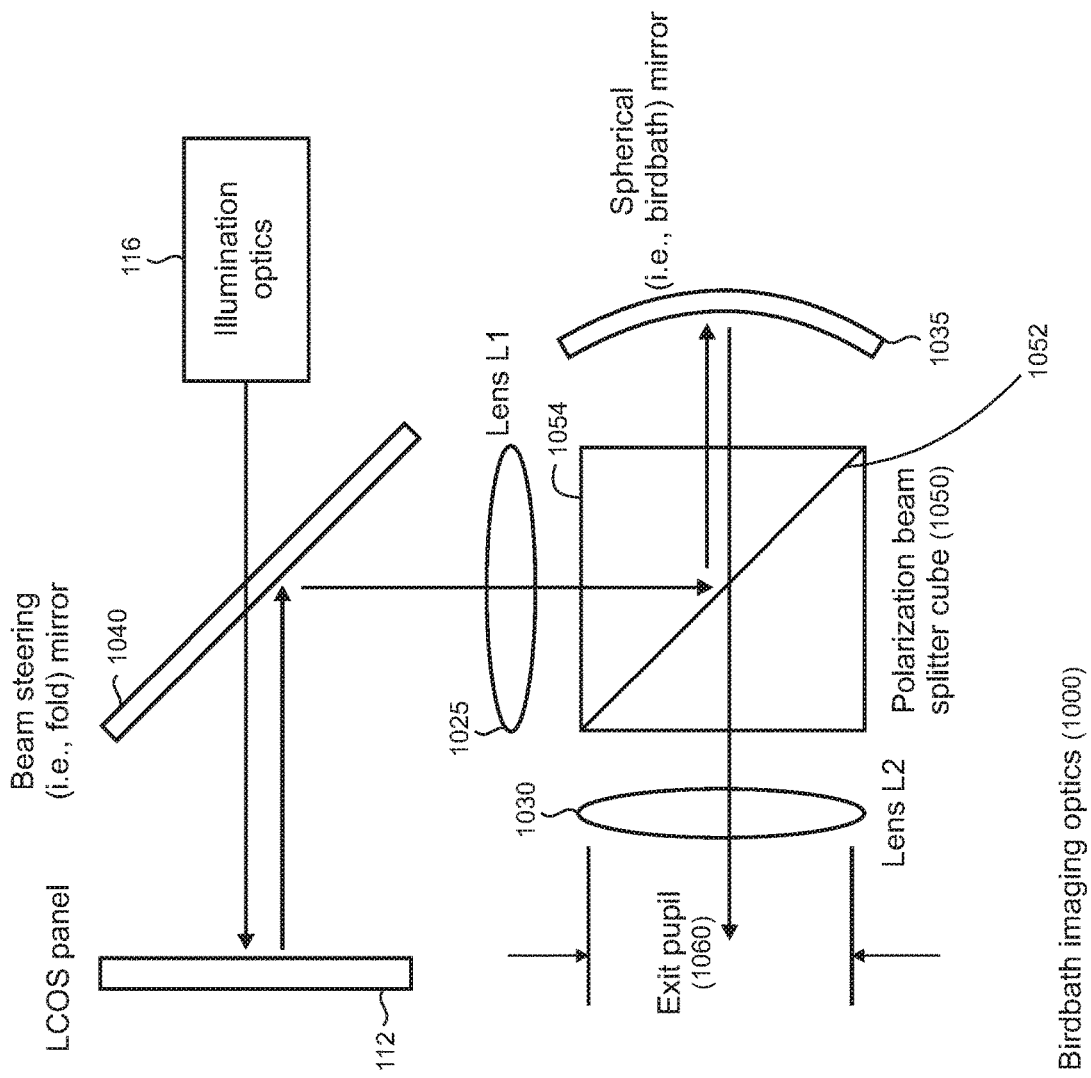
FIG. 10 shows an illustrative projector arrangement used for imaging optics in a light engine employing a birdbath mirror.

FIG. 10 shows another illustrative example of imaging optics 118 in the light engine 105 using birdbath imaging optical 1000 that includes a spherical or birdbath mirror 1035. In this arrangement, the illumination optics 116 provide virtual image light to a reflective LCOS panel 112. The light reflecting from the panel is steered by a beam steering (e.g., fold) mirror 1040 through a first lens (L1) 1025 which directs the light to polarization beam splitter (PBS) cube 1050.

The PBS cube 1050 comprises two right angle prisms which are joined at a planar interface 1052 defined by each prism's hypotenuse. The PBS cube is configured as a hexahedron in typically implementations with square faces, however other configurations such as rhomboid prisms (i.e., lateral displacement beam splitters) can also be utilized in some implementations. Other beam splitting devices may be alternatively utilized including, for example, plate beam splitters, wire grid beam splitters, diffraction grating beam splitters, and other suitable beam splitters.

The interface between the prisms (referred to here as a "beam splitter interface") is configured to be polarization-sensitive using, for example, a dielectric beam splitter coating that can reflect and transmit a portion of an incident light beam. When an incoming randomly polarized beam is incident on the entrance face 1054, the PBS cube splits the beam into two orthogonal, linearly polarized components including an s-polarized component and a p-polarized component (s-polarized light is also referred to as TE (traverse electric), and p-polarized as TM (transverse magnetic)). S-polarized light is reflected at a 90-degree angle towards the birdbath mirror 1035 with respect to the incident beam while p-polarized light is transmitted through the PBS cube without being altered. That is, the PBS cube 1050 provides a 90-degree separation between the reflected and transmitted beams. In some implementations, one or more of the four entrance/exit faces of the PBS cube may be coated with an antireflection coating to minimize back reflections.

The image light reflected from the birdbath mirror 1035 passes through the PBS cube 1050 to a second lens (L2) 1030 which forms an exit pupil 1060.

Figure 11:
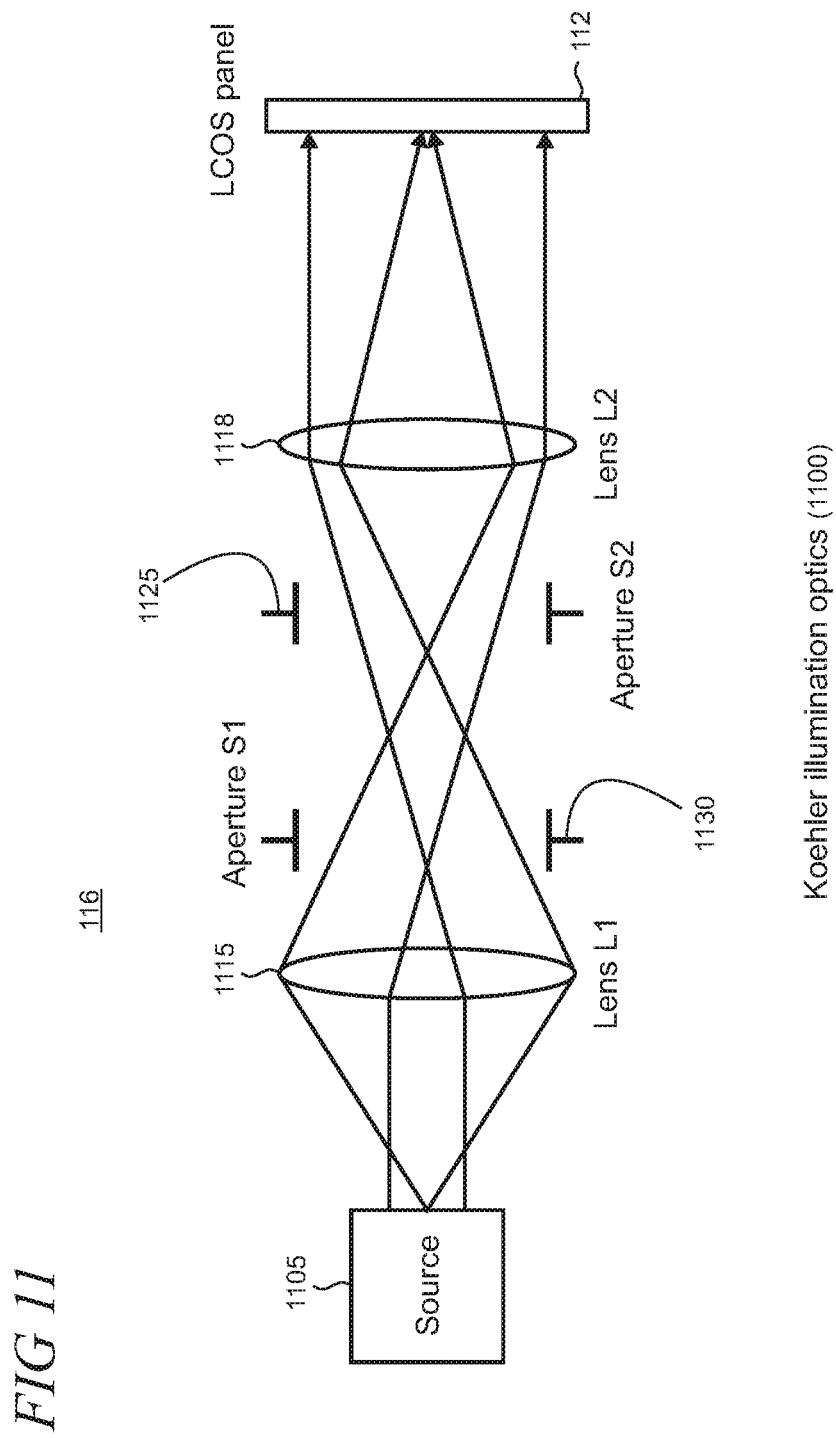
FIG. 11 shows an illustrative example of illumination optics in a light engine using a Koehler illumination arrangement.

FIG. 11 shows an illustrative example of illumination optics 116 in a light engine 105 (FIG. 1) using a Koehler illumination optics arrangement 1100. In this illustrative example, a source 1105 such as one or more LEDs (light emitting diodes) provides illumination light which is passed through a series of lenses L1 and L2 (elements 1115 and 1118 in FIG. 11) and apertures S1 and S2 (elements 1130 and 1125 in FIG. 11) to the LCOS panel 112. The lenses L1 and L2 may provide collimating or magnifying functions, or provide both functions.

Figure 12:
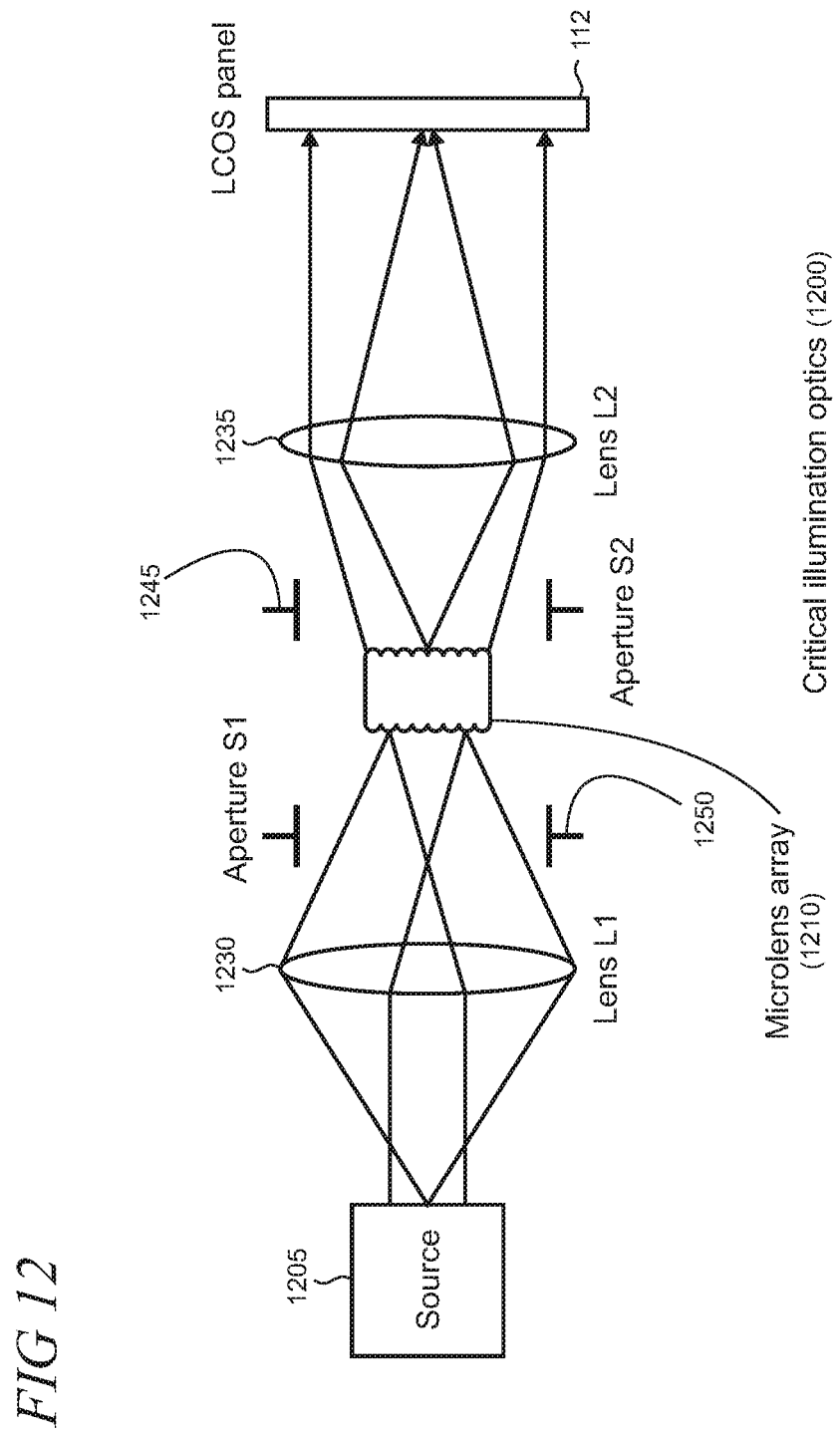
FIG. 12 shows an illustrative example of illumination optics in a light engine using a critical illumination arrangement.

FIG. 12 shows an illustrative example of illumination optics 116 in a light engine 105 (FIG. 1) using a critical illumination optics arrangement 1200. In this illustrative example, a source 1205, such as one or more LEDs, provides illumination light which is passed through a series of lenses L1 and L2 (elements 1230 and 1235 in FIG. 12) and apertures S1 and S2 (elements 1250 and 1245 in FIG. 12) to the LCOS panel 112. As shown, a microlens array (MLA) 1210 is located between the lenses L1 and L2. The MLA may be utilized to provide an increase in pupil size which can broaden the light cone incident on a given pixel in the LCOS panel 112.

Figure 13:
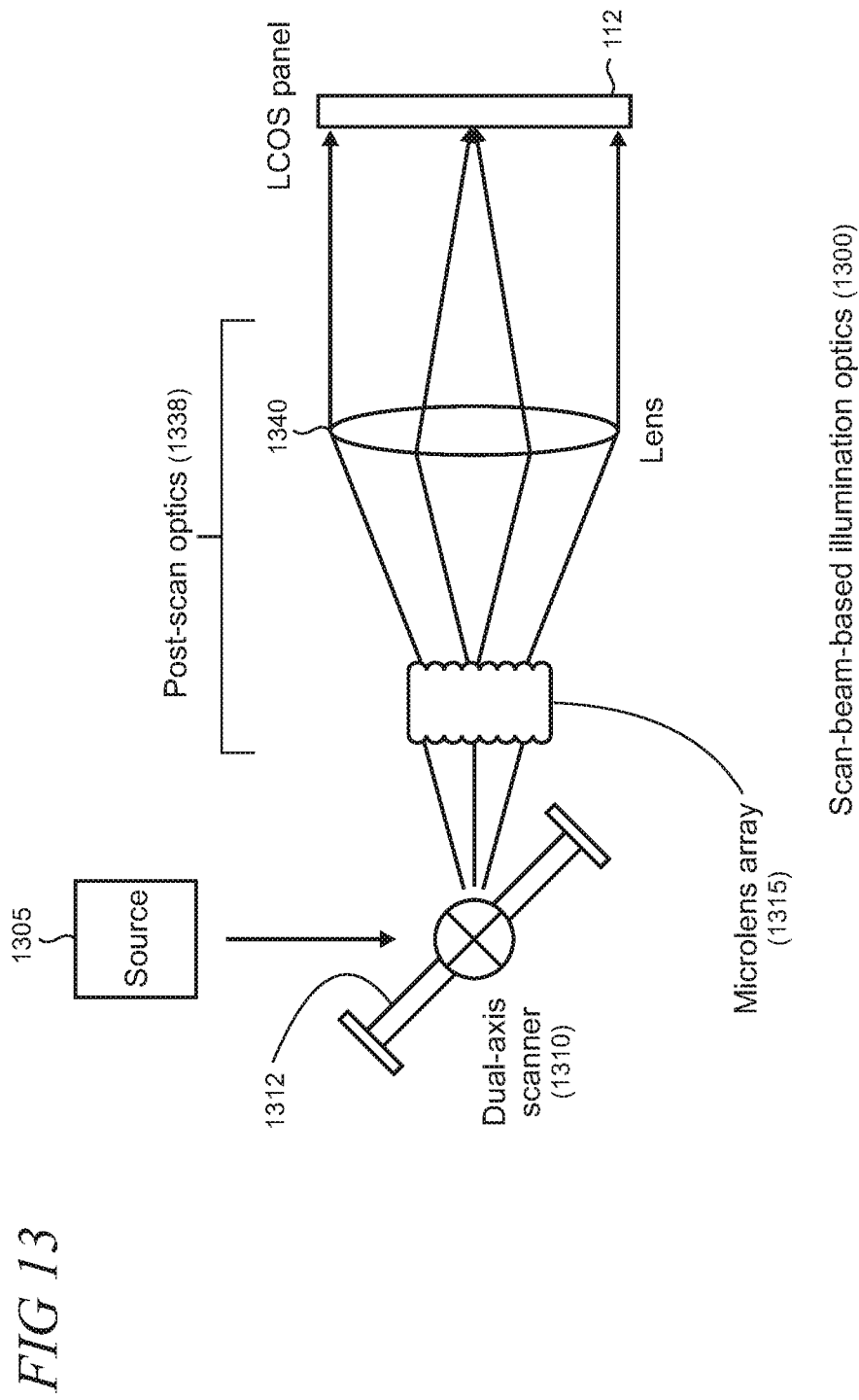
FIG. 13 shows an illustrative example of illumination optics in a light engine using a scan-beam-based illumination arrangement.

FIG. 13 shows an illustrative example of illumination optics 116 in a light engine 105 (FIG. 1) using a scan-beam-based optics arrangement 1300. A source 1305 such as a laser, LED, or the like provides illumination light which is subject to raster scanning using a dual axis scanner such as MEMS scanner 1310. MEMS scanners are also referred to as beam deflectors. A scanning plate 1312 in the scanner 1310 comprises a reflective surface (e.g., mirror) that is used to scan an impinging beam over an FOV which is movably suspended to one or more structures (not shown) in a MEMS device using lateral torsional flexures, or other suitable arrangements such as bending flexures. The reflective surface may include a plated reflective metal such as gold or aluminum, a dielectric stack, bare silicon, or other materials depending upon wavelength and other design criteria. The scanning plate 1312 may be configured with a rectangular footprint, although circular or oval footprints may also be utilized in some applications.

Various actuation technologies (not shown in the drawings) for MEMS scanners may be utilized depending on the needs of a particular implementation. Electrocapacitive drive scanners include both rear drive pad and comb drive architectures. Magnetic drive scanners include moving coil and moving magnet types. Other technologies include thermal, piezoelectric, and impact motor drives. Electrocapacitive drive systems may be referred to as electrostatic and bending flexures may be referred to as cantilever arms. MEMS scanners may be operated non-resonantly, and resonantly in some cases which may reduce power consumption.

In this example, the MEMS scanner 1310 is configured as a dual axis (i.e., 2D) scanner to provide 2D scanning whereby the axes of rotation are positioned to be at substantially right angles to each other. The MEMS scanner is rotated about one axis to perform a fast scan, while rotation around the other axis enables performance of a slow scan. Typically, the fast scan sweeps back and forth horizontally across the FOV while the slow scan indexes down the FOV by one or two lines. Such systems may be termed progressive scan systems in which the beams of image light may be scanned unidirectionally or bidirectionally depending upon the desired resolution, frame rate, and scanner capabilities.

The fast scan generally operates at a relatively high scan rate while the slow scan operates at a scan rate equal to the video frame rate. In some applications, the fast scan operates resonantly while the slow scan provides a substantially sawtooth pattern, scanning progressively down the frame for a portion of a frame and then flying back to the top of the frame to start over. In other applications, interleaved sawtooth scanning, triangular wave scanning, sinusoidal scanning, and other waveforms are used to drive one or both axes.

The scanner 1310 operates in combination with post-scan optics 1338 including an MLA 1315 and lens 1340 to provide illumination to the LCOS panel 112, as shown in FIG. 13. The post-scan optics 1338 may be utilized to provide an increase in pupil size which can broaden the light cone incident on a given pixel in the LCOS panel 112.

Figure 14:
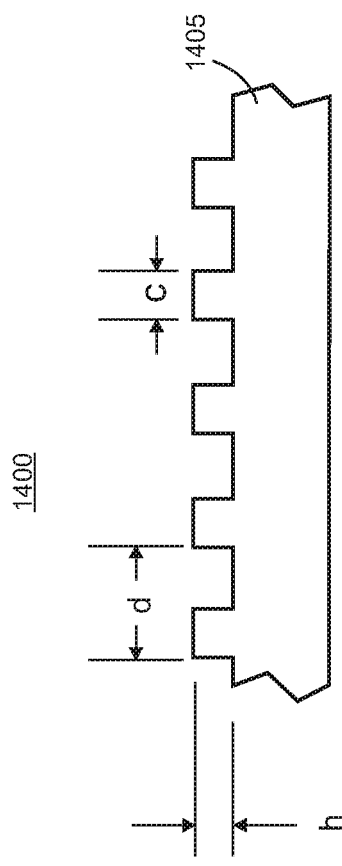
FIG. 14 shows a profile of a portion of an illustrative diffraction grating that has straight gratings.
Figure 15:
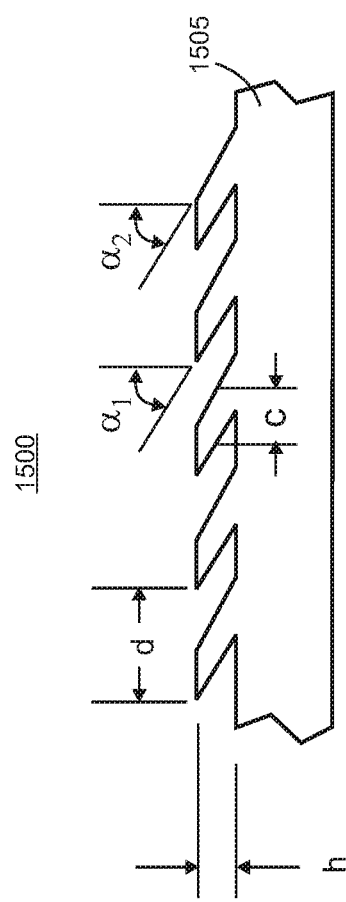
FIG. 15 shows a profile of a portion of an illustrative diffraction grating that has asymmetric or slanted gratings.

The grating features used in the DOEs in the waveguide display 800 (FIG. 8) can take various suitable forms. For example, FIG. 14 shows a profile of straight (i.e., non-slanted) grating features 1400 (referred to as grating bars, grating lines, or simply "gratings"), that are formed in a substrate 1405 in 1D and 2D grating arrangements. By comparison, FIG. 15 shows grating features 1500 formed in a substrate 1505 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles, for example to support polarization-sensitive Bragg gratings and other structures. In FIGS. 14 and 15, the grating period is represented by d, the grating height by h, the bar width by c, and the filling factor by f, where f=c/d. The slanted gratings in FIG. 15 may be described by slant angles $\alpha_1$ and $\alpha_2$.

FIGS. 16-19 show various illustrative 2D diffraction gratings which may be utilized in some implementations to impart target characteristics to a given DOE such as polarization sensitivity, grating vector direction, and the the like. The 2D gratings in the FIGS. 16-19 are intended to be illustrative and not limiting, and it is contemplated that variations from the 2D gratings shown may also be utilized. Gratings may include symmetric and/or asymmetric features including slanted gratings (i.e., gratings having walls that are non-orthogonal according to one or more predetermined angles to a plane of the waveguide) and blazed gratings (i.e., gratings having asymmetric triangular or sawtooth profiles) in some cases. Various suitable surface relief contours, filling factors, grating periods, and grating dimensions can also be utilized to meet the needs of a particular implementation.

Figure 16:
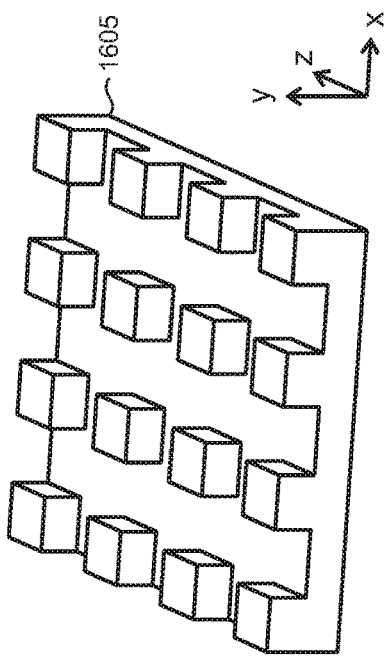
FIGS. 16-19 show various illustrative two-dimensional diffraction gratings.
Figure 17:
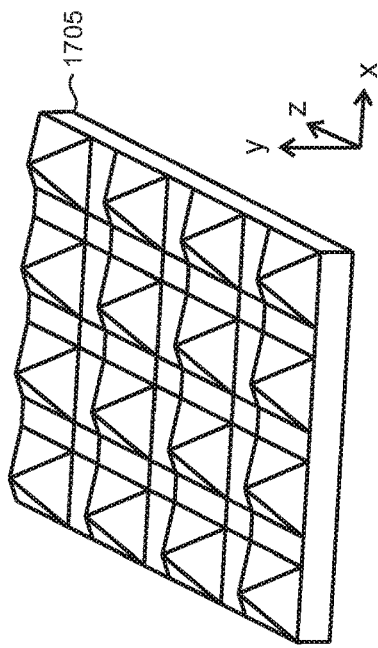
Figure 18:
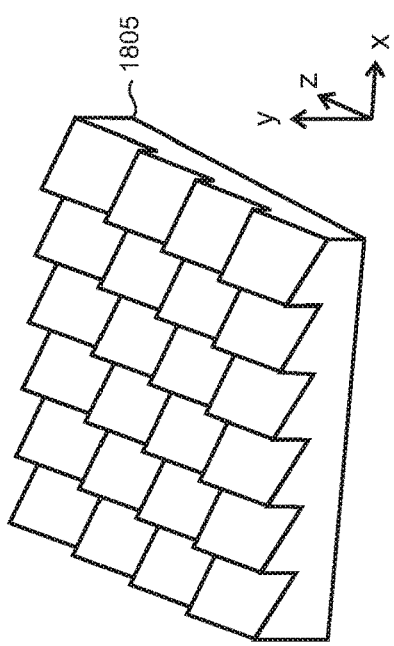
Figure 19:
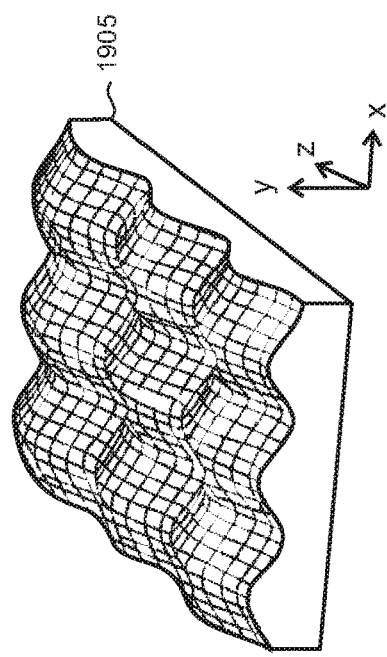

FIG. 16 shows a 2D grating 1605 that includes quadrangular elements that project from a substrate. The quadrangular elements can also be configured to be asymmetric such as being slanted or blazed. Non-quadrangular three-dimensional geometries (both symmetric and asymmetric) may also be utilized for a 2D grating including, for example, cylindrical elements, polygonal elements, elliptical elements, or the like. For example, FIG. 17 shows a 2D grating 1705 that includes pyramidal elements, and FIG. 18 shows a 2D grating 1805 that includes elements that have a blazed profile in each of the x and z directions. Gratings may also have elements with curved profiles, as shown in the illustrative 2D grating 1905 in FIG. 19.

Figure 20:
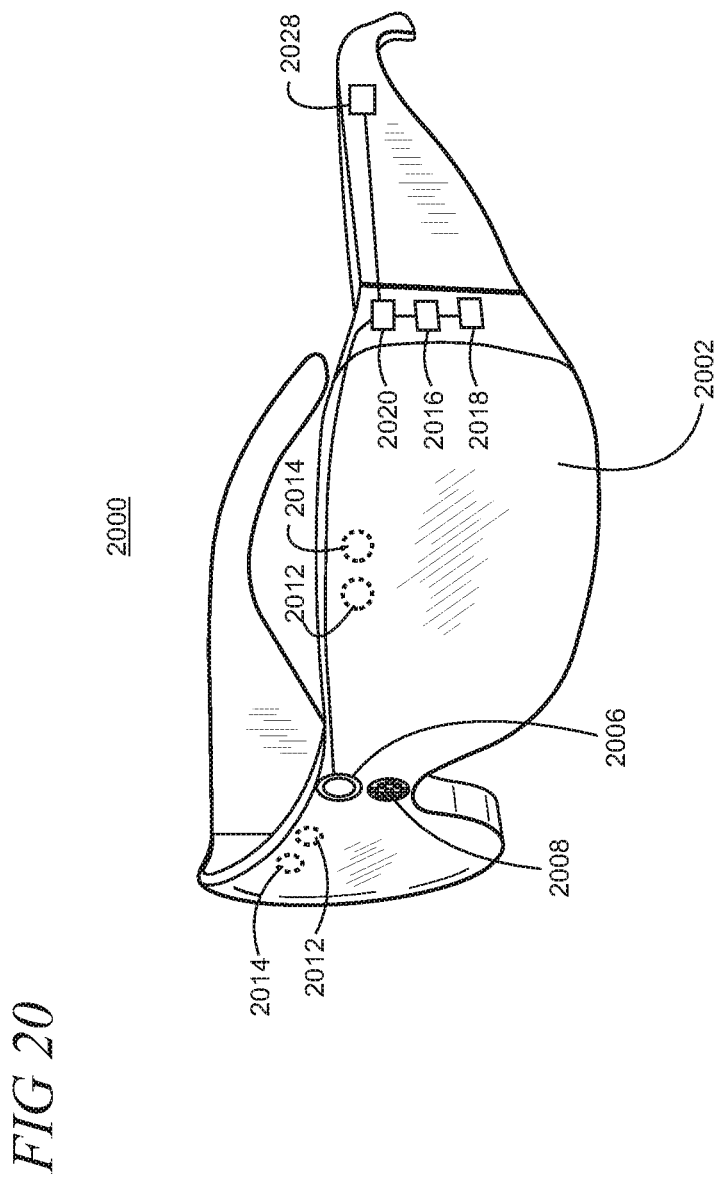
FIG. 20 is a pictorial view of an illustrative example of a virtual reality or augmented reality HMD device that may use a scanner-illuminated LCOS projector.
Figure 21:
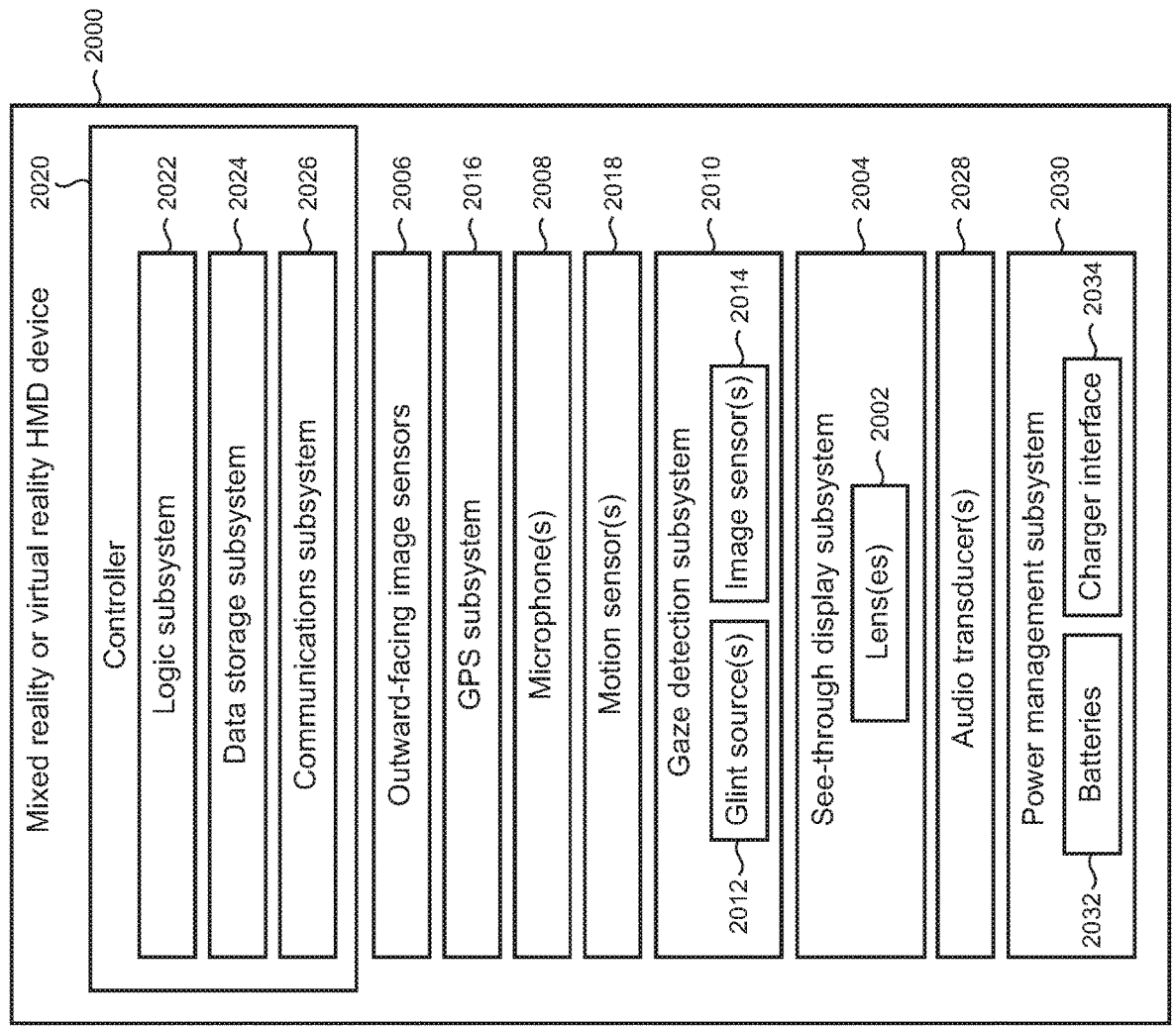
FIG. 21 shows a block diagram of an illustrative example of a virtual reality or augmented reality HMD device that may use a scanner-illuminated LCOS projector.

The present scanner-illuminated LCOS projector may be utilized in augmented- or virtual-reality applications. FIG. 20 shows one particular illustrative example of an augmented-reality HMD device 2000, and FIG. 21 shows a functional block diagram of the device 2000. HMD device 2000 comprises one or more lenses 2002 that form a part of a see-through display subsystem 2004, so that images may be displayed using lenses 2002 (e.g. using projection onto lenses 2002, one or more waveguide systems, such as a near-eye display system, incorporated into the lenses 2002, and/or in any other suitable manner). HMD device 2000 further comprises one or more outward-facing image sensors 2006 configured to acquire images of a background scene and/or physical environment being viewed by a user, and may include one or more microphones 2008 configured to detect sounds, such as voice commands from a user. Outward-facing image sensors 2006 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The HMD device 2000 may further include a gaze detection subsystem 2010 configured for detecting a direction of gaze of each eye of a user or a direction or location of focus, as described above. Gaze detection subsystem 2010 may be configured to determine gaze directions of each of a user's eyes in any suitable manner. For example, in the illustrative example shown, a gaze detection subsystem 2010 includes one or more glint sources 2012, such as infrared light sources, that are configured to cause a glint of light to reflect from each eyeball of a user, and one or more image sensors 2014, such as inward-facing sensors, that are configured to capture an image of each eyeball of the user. Changes in the glints from the user's eyeballs and/or a location of a user's pupil, as determined from image data gathered using the image sensor(s) 2014, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2010 may have any suitable number and arrangement of light sources and image sensors. In some implementations, the gaze detection subsystem 2010 may be omitted.

The HMD device 2000 may also include additional sensors. For example, HMD device 2000 may comprise a global positioning system (GPS) subsystem 2016 to allow a location of the HMD device 2000 to be determined. This may help to identify real-world objects, such as buildings, etc. that may be located in the user's adjoining physical environment.

The HMD device 2000 may further include one or more motion sensors 2018 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 2006. The use of motion data may allow changes in gaze direction to be tracked even if image data from outward-facing image sensor(s) 2006 cannot be resolved.

In addition, motion sensors 2018, as well as microphone(s) 2008 and gaze detection subsystem 2010, also may be employed as user input devices, such that a user may interact with the HMD device 2000 via gestures of the eye, neck and/or head, as well as via verbal commands in some cases. It may be understood that sensors illustrated in FIGS. 20 and 21 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2000 can further include a controller 2020 such as one or more processors having a logic subsystem 2022 and a data storage subsystem 2024 in communication with the sensors, gaze detection subsystem 2010, display subsystem 2004, and/or other components through a communications subsystem 2026. The communications subsystem 2026 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2024 may include instructions stored thereon that are executable by logic subsystem 2022, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2000 is configured with one or more audio transducers 2028 (e.g., speakers, earphones, etc.) so that audio can be utilized as part of a mixed reality or virtual reality experience. A power management subsystem 2030 may include one or more batteries 2032 and/or protection circuit modules (PCMs) and an associated charger interface 2034 and/or remote power interface for supplying power to components in the HMD device 2000.

It may be appreciated that the HMD device 2000 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 22:
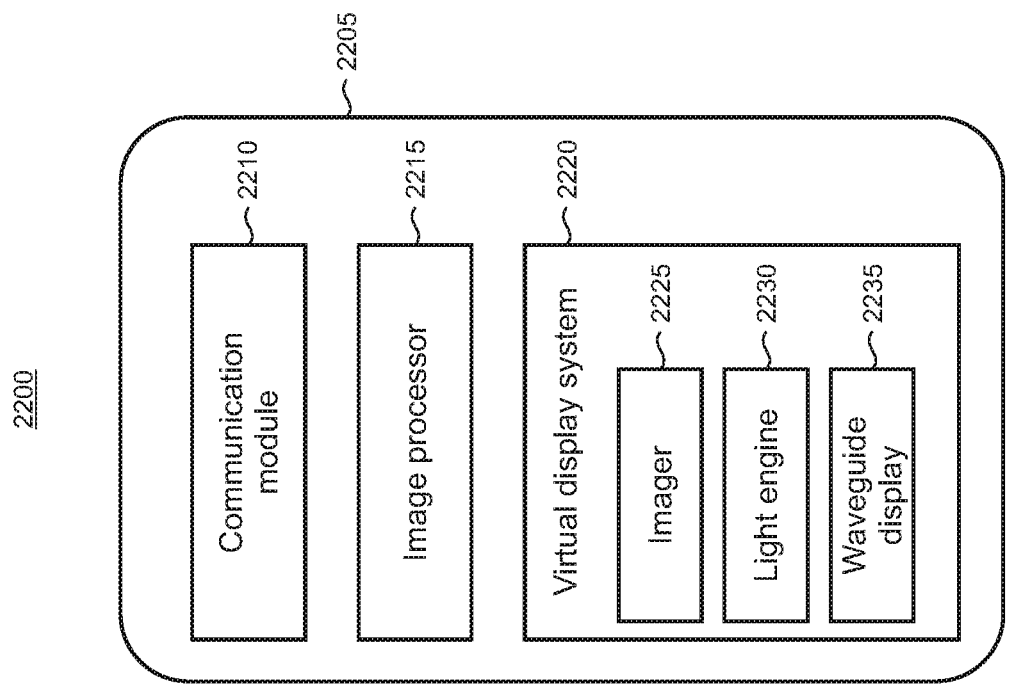
FIG. 22 shows a block diagram of an illustrative electronic device that incorporates an augmented reality display system that may use a scanner-illuminated LCOS projector.

As shown in FIG. 22, the scanner-illuminated LCOS projector can be used in a mobile or portable electronic device 2200, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 2200 includes a housing 2205 to house a communication module 2210 for receiving and transmitting information from and to an external device, or a remote system or service (not shown).

The portable device 2200 may also include an image processor 2215 using one or more processors for handling the received and transmitted information, and a virtual display system 2220 to support viewing of images. The virtual display system 2220 can include a micro-display or an imager 2225, a light engine 2230 and a waveguide display 2235. The image processor 2215 may be operatively connected to the imager 2225 to provide image data, such as video data so that images may be displayed using the light engine 2230 and waveguide display 2235. An EPE may be included in the waveguide display 2235.

The scanner-illuminated LCOS projector may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present scanner-illuminated LCOS projector for head mounted display are now presented by way of illustration and not as an exhaustive list of all embodiments. An example includes a near-eye optical display system configured to show images within a field of view (FOV), comprising: a waveguide display comprising one or more diffractive optical elements (DOEs) including an in-coupling DOE configured for in-coupling image light to the waveguide display; and a light engine comprising a micro-display, illumination optics, and image optics, in which the micro-display projects the image light into the waveguide display at the in-coupling DOE, wherein the illumination optics include an illumination light source, comprising one of laser or LED (light emitting diode), and a MEMS (micro-electro mechanical system) scanner configured for raster scanning light from the illumination light source to illuminate the micro-display.

In another example, the MEMS scanner is a dual-axis scanner operated in reflection using a moveable reflective surface and further is arranged for fast scanning along a first axis and slow scanning along a second axis. In another example, the waveguide display further includes at least one intermediate DOE and an out-coupling DOE, wherein the at least one intermediate DOE provides exit pupil expansion in a first direction of the FOV and the out-coupling DOE provides exit pupil expansion in a second direction of the FOV. In another example, the micro-display comprises one of an LCOS (liquid crystal on silicon) panel operating in reflection, a pixel array, or an image source using one or more of light emitting diode (LED), OLED (organic light emitting diode), liquid crystal (LC), or digital light processing (DLP). In another example, the near-eye optical display system further includes post-scan optics in an optical path between the MEMS scanner and the LCOS panel. In another example, the post-scan optics include one or more of microlens array, magnifying lens, or collimating lens.

A further example includes a head mounted display (HMD) device configured to display images within a field of view (FOV) having first and second directions with improved non-uniformity, comprising: an imaging panel that produces virtual images; illumination optics configured to provide illumination light to the imaging panel from a source using a MEMS (micro-electro mechanical system) device operating to raster scan illumination light onto the imaging panel; a combiner comprising one of numerical aperture (NA) converter or exit pupil expander (EPE); and imaging optics configured to couple image light from the imaging panel into the combiner.

In another example, the imaging panel operates in one of transmission or reflection. In another example, the imaging optics include one of birdbath imaging optics or direct eyepiece optics. In another example, the MEMS device is operated to provide raster scanning through a fast axis and a slow axis. In another example, the EPE comprises waveguide-based display comprising one or more diffractive optical elements (DOEs) configured for in-coupling light from the imaging panel, expanding an exit pupil of the image light, and out-coupling the image light from the display with expanded exit pupil. In another example, the imaging optics further comprise magnifying or collimating optics to provide increased exit pupil and field of view of the displayed images.

A further example includes a device configured to control image light associated with virtual images within a field of view (FOV), comprising: an imager configured to generate the virtual images; a waveguide display including an in-coupling diffractive optical element (DOE) configured to in-couple virtual image light into the waveguide display, at least one intermediate DOE configured to expand an exit pupil of the image light in a first direction of the FOV, and an out-coupling DOE configured to expand the exit pupil of the image light in a second direction of the FOV and further configured to out-couple image light out of the waveguide display to an eye of a user of the device; and a MEMS (micro-electro mechanical system) scanner configured to perform raster scanning of illumination light from an illumination light source to illuminate the imager to thereby generate the virtual image light.

In another example, the device further comprises birdbath imaging optics comprising one or more of fold mirror or polarization beam splitter and one or more lenses configured for magnifying or collimating the virtual image light. In another example, the imager is a micro-display. In another example, the illumination light source is a laser. In another example, the virtual images are color images using different colors, and the MEMS scanner is operated to modulate per-color intensity. In another example, the imager is operated using an RGB (red, green, blue) color model. In another example, the waveguide display is configured as a near-eye display. In another example, the MEMS scanner and imager are operated as a pico projector.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An optical display system configured to show images within a field of view (FOV), comprising:
    a waveguide operable as a near-eye display comprising one or more diffractive optical elements (DOEs) including an in-coupling DOE configured for in-coupling image light to the waveguide; and
    a light engine comprising a micro-display, illumination optics, and image optics, in which the micro-display projects the image light into the waveguide at the in-coupling DOE,
    wherein the illumination optics include
  an illumination light source, comprising one of laser or LED (light emitting diode), and a MEMS (micro-electro mechanical system) scanner configured for raster scanning light from the illumination light source to illuminate the micro-display.

2. The optical display system of claim 1 in which the MEMS scanner is a dual-axis scanner operated in reflection using a moveable reflective surface and further is arranged for fast scanning along a first axis and slow scanning along a second axis.

3. The optical display system of claim 1 in which the waveguide further includes at least one intermediate DOE and an out-coupling DOE, wherein the at least one intermediate DOE provides exit pupil expansion in a first direction of the FOV and the out-coupling DOE provides exit pupil expansion in a second direction of the FOV.

4. The optical display system of claim 1 in which the micro-display comprises one of an LCOS (liquid crystal on silicon) panel operating in reflection, a pixel array, or an image source using one or more of light emitting diode (LED), OLED (organic light emitting diode), liquid crystal (LC), or digital light processing (DLP).

5. The optical display system of claim 4 further including post-scan optics in an optical path between the MEMS scanner and the LCOS panel.

6. The optical display system of claim 5 in which the post-scan optics include one or more of microlens array, magnifying lens, or collimating lens.

7. A head mounted display (HMD) device including a chain of optical elements configured to display images to a user's eye within a field of view (FOV) having first and second directions with improved non-uniformity, the optical elements comprising:

an imaging panel that produces virtual images;
illumination optics configured to provide illumination light to the imaging panel from a source using a MEMS (micro-electro mechanical system) device operating to raster scan illumination light onto the imaging panel;
a combiner comprising one of numerical aperture (NA) converter or exit pupil expander (EPE); and
imaging optics configured to couple image light from the imaging panel into the combiner, wherein illumination light propagates on a path along the chain of the optical elements comprising the illumination optics, the imaging panel, imaging optics, and combiner in series, such that the combiner is last in the series to thereby display images on the user's eye.

8. The HMD device of claim 7 wherein the imaging panel operates in one of transmission or reflection.

9. The HMD device of claim 7 wherein the imaging optics include one of birdbath imaging optics or direct eyepiece optics.

10. The HMD device of claim 7 wherein the MEMS device is operated to provide raster scanning through a fast axis and a slow axis.

11. The HMD device of claim 7 wherein the EPE comprises waveguide-based display comprising one or more diffractive optical elements (DOEs) configured for in-coupling light from the imaging panel, expanding an exit pupil of the image light, and out-coupling the image light from the display with expanded exit pupil.

12. The HMD device of claim 7 in which the imaging optics further comprise magnifying or collimating optics to provide increased exit pupil and field of view of the displayed images.

13. A device configured to control image light associated with virtual images within a field of view (FOV), comprising:

an imager configured to generate the virtual images;
a waveguide including an in-coupling diffractive optical element (DOE) configured to in-couple virtual image light into the waveguide, at least one intermediate DOE configured to expand an exit pupil of the image light in a first direction of the FOV, and an out-coupling DOE configured to expand the exit pupil of the image light in a second direction of the FOV and further configured to out-couple image light out of the waveguide to an eye of a user of the device; and
a MEMS (micro-electro mechanical system) scanner configured to perform raster scanning of illumination light from an illumination light source to illuminate the imager to thereby generate the virtual image light.

14. The device of claim 13 further comprising birdbath imaging optics comprising one or more of fold mirror or polarization beam splitter and one or more lenses configured for magnifying or collimating the virtual image light.

15. The device of claim 13 in which the imager is a micro-display.

16. The device of claim 13 in which the illumination light source is a laser.

17. The device of claim 13 in which the virtual images are color images using different colors, and the MEMS scanner is operated to modulate per-color intensity.

18. The device of claim 17 in which the imager is operated using an RGB (red, green, blue) color model.

19. The device of claim 13 in which the waveguide is configured as a near-eye display.

20. The device of claim 13 in which the MEMS scanner and imager are operated as a pico projector.

* * * * *